United States Patent [19]

Izushima et al.

[11] 4,244,031
[45] Jan. 6, 1981

[54] WORD PROCESSOR

[75] Inventors: Masaaki Izushima; ShinTaro Abe; Tomoyuki Haganuma, all of Tokyo, Japan

[73] Assignee: Ricoh Company, Ltd., Tokyo, Japan

[21] Appl. No.: 841,830

[22] Filed: Oct. 13, 1977

[30] Foreign Application Priority Data

Oct. 18, 1976 [JP] Japan ............................. 51-24604
Oct. 21, 1976 [JP] Japan ............................. 51-126641

[51] Int. Cl.³ .................. G06F 3/02; G06F 3/12; G06F 3/153
[52] U.S. Cl. .................................................. 364/900
[58] Field of Search ... 364/900 MS File, 200 MS File

[56] References Cited

U.S. PATENT DOCUMENTS

| | | | |
|---|---|---|---|
| 3,998,311 | 12/1976 | Greek, Jr. et al. | 364/900 |
| 4,031,518 | 6/1977 | Holloran et al. | 364/900 |
| 4,054,948 | 10/1977 | Grier et al. | 364/900 |

Primary Examiner—Raulfe B. Zache
Attorney, Agent, or Firm—David G. Alexander

[57] ABSTRACT

Character and control code data are input from a keyboard into a memory. A CRT display unit displays one line of data stored in the memory. A printer is automatically activated to print the line of data in response to a carriage return or line feed code, a hyphen near the right margin or a space near the right margin with a character in the right margin position. In the latter case, the next line is displayed starting with the character position following the space. The printer prints the line while the next line is being input and displayed. The margins, tab positions and a hot zone near the right margin are displayed above the line of data while a cursor is displayed below the line. Character codes such as backspace codes are displayed with the data and the positions of the data on the display always correspond to the printed data positions.

15 Claims, 11 Drawing Figures

| DATA CODE | OUTSIDE HOT ZONE | INSIDE HOT ZONE |
|---|---|---|
| A/N | | |
| S P | | SET 28 AND TRANSFER 43 INTO 56 |
| (—) | | SET 29 |
| C R | SET 31 | SET 31 |
| L F | SET 32 AND LINE TAIL REGISTER | SET 32 AND LINE TAIL REGISTER |
| OTHER | | |

Fig. 5

| DATA CODE | ADDRESS POINTER |
|---|---|
| A/N | UP 1 |
| S P | UP 1 |
| (—) | UP 1 |
| C R | 0 |
| L F | 0 |
| TAB | SLEW UP TO TAB POSITION |
| BSP | DOWN 1 |
| HLF | 0 |
| HRLF | 0 |
| M R | 0 |
| END | 0 |

| INPUT | DISPLAY | | |
|-------|---------|---|---|
| ABC | ABC- | | |
| TAB | ABC→ | — | |
| Y | ABC→ | Y- | |
| BSP | ABC→ | Y⏋ | |
| = | ABC→ | =⏋ | |
| SP | ABC→ | = | _ |
| 1,000 | ABC→ | = | 1,000_ |

WORD PROCESSOR

BACKGROUND OF THE INVENTION

The present invention relates to a word processor or text editor. Prior art devices of comparable function comprise automatic typewriters which allow editing of input data subsequent to playback. More specifically, the typist types in the data for printing and backspaces and types over to correct mistakes. Then, a button is depressed and the entire page is automatically printed or typed in corrected form.

Such an automatic typewriter, while allowing efficient correction of mistakes, suffers from several disadvantages. The page, while being initially typed, becomes cluttered and hard to read if there are a number of typeovers. This increases the possibility for error. It is not difficult to overlook a typographical error on a cluttered page and such an error requires correction and a second playback to produce an errorless copy. Another disadvantage of the typical automatic typewriter is slow operating speed. The typewriter may not be used to compose another page until the playback or printing of the first page is completed.

Another prior art device comprises a cathode ray tube which displays an entire page of printed characters. Subsequent to composing and correction of errors on the screen, that is, only after composition and correction of errors of the entire page, the entire page is printed. These systems suffer from the same drawback in that the display is inaccessible during printing.

Yet another drawback of such systems is that the display does not correspond to the printed page under some circumstances. In cases when the backspace and typeover functions, for example, are used to produce a Japanese Yen symbol (¥) by superimposing an equal sign (=) on the capital letter (Y), the position of subsequent data on the display does not correspond to the data as printed. This is because the printer has various control functions which are not provided to the display.

SUMMARY OF THE INVENTION

The present invention overcomes the drawbacks of the prior art by providing a CRT display unit which displays only one line of input data in addition to margin and similar position codes. After composition of the line, a printer prints out the line in response to a line feed code or the like. The next line may be input and displayed while the first line is being printed.

It is an object of the present invention to provide a word processor of increased operating speed compared to prior art apparatus.

It is another object of the present invention to provide a word processor comprising a CRT display which displays one line of characters and allows printing of one line while another line is being input.

It is another object of the present invention to provide a word processor which comprises a display unit on which characters are always displayed in the same positions as they appear after printing.

It is another object of the present invention to provide a word processor of increased efficiency at low manufacturing cost.

It is another object of the present invention to provide a generally improved word processor.

Other objects, together with the foregoing, are attained in the embodiment described in the following description and illustrated in the accompanying drawing.

DESCRIPTION OF THE PREFERRED EMBODIMENT

While the word processor of the invention is susceptible of numerous physical embodiments, depending upon the environment and requirements of use, substantial numbers of the herein shown and described embodiment have been made, tested and used, and all have performed in an eminently satisfactory manner.

Figure 1:
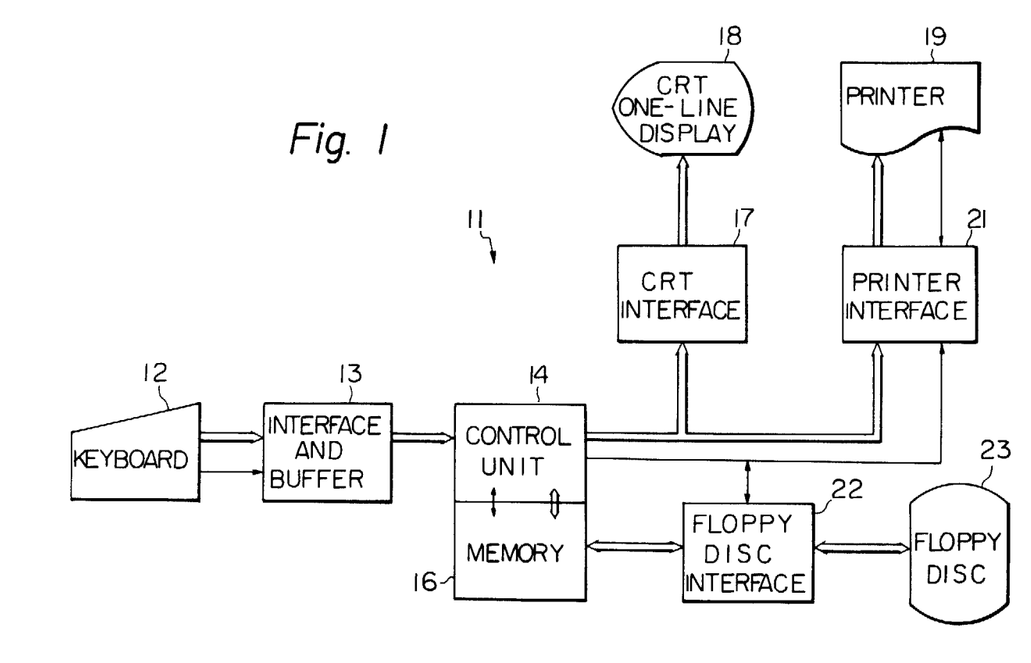
FIG. 1 is a general block diagram of a word processor embodying the present invention.

Referring now to FIG. 1 of the drawing, a word processor embodying the present invention is generally designated by the reference numeral 11 and comprises an input keyboard 12. Although not shown in detail, the keyboard 12 comprises a number of keys of inputting alphanumeric character data, symbols such as @, #, $, %, ¢, & and *, and control codes such as backspace, carriage return and the like. The output of the keyboard 12 is applied through an interface and buffer 13 and a control unit 14 to a memory 16. The control unit 14 feeds the data from the memory 16 through a cathode ray tube (CRT) interface 17 to a CRT display unit 18 which displays one line of data. The control unit 14 is constructed so that when a carriage return or line feed code is detected in the data from the memory 16, the line of data is fed to a printer 19 through a printer interface 21 and printed. The line of data is also fed through a floppy disc interface 22 to a floppy disc 23 for mass storage. The floppy disc 23 has the capacity to store many pages of character data and is constructed so that the data may be read therefrom and fed to the printer 19 to type entire pages automatically at any subsequent time.

In addition to the carriage return and line feed codes, the printer 19 will automatically print out the line of data when a hyphen (-) is detected in the data in a hot zone. Also, the printer 19 will print out the line of data when a space code is detected sufficiently close to the right margin and a character code is simultaneously detected in the right margin position. In this latter case, the next line of data displayed will begin with a data position following the space code. The apparatus 11 operates at optimum efficiency since the next line of input data is displayed on the display unit 18 while the previous line is being printed by the printer 19. The apparatus 11 is capable of various editing functions such as typeover, character insert and delete and the like although such is not the particular subject matter of the present invention and will not be described in detail. It is believed sufficient to state that the apparatus 11 provides the capability of perfectly composing the individual lines of data prior to printing.

Figure 7:
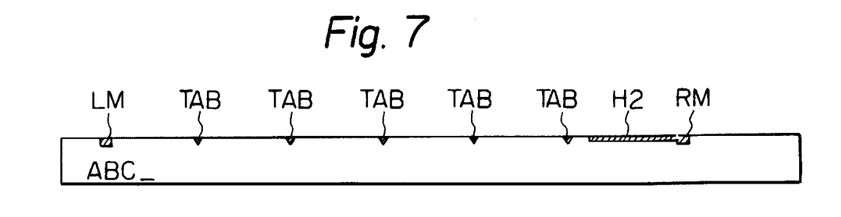
FIGS. 7 to 9 are diagrams illustrating examples of character displays on a display unit of the word processor.

Referring to FIG. 7, it will be seen that the present apparatus 11 also has the capability of displaying various marks above and below the line of data, FIG. 7 illustrating the appearance of a screen (not designated) of the display unit 18. It will be seen that left margin (LM), tabulation (tab), right margin (RM) and hot zone (HZ) marks are displayed above the line of data which is shown as being constituted by the alphabetic upper case characters (A), (B) and (C). The hot zone is constituted by a number of character positions to the left of the right margin which can be selected in accordance with the preference of the operator. Printing is effected if a hyphen or space code is detected in the hot zone. Also displayed below the line of data is a cursor which indicates the next position for data entry.

Figure 2A:
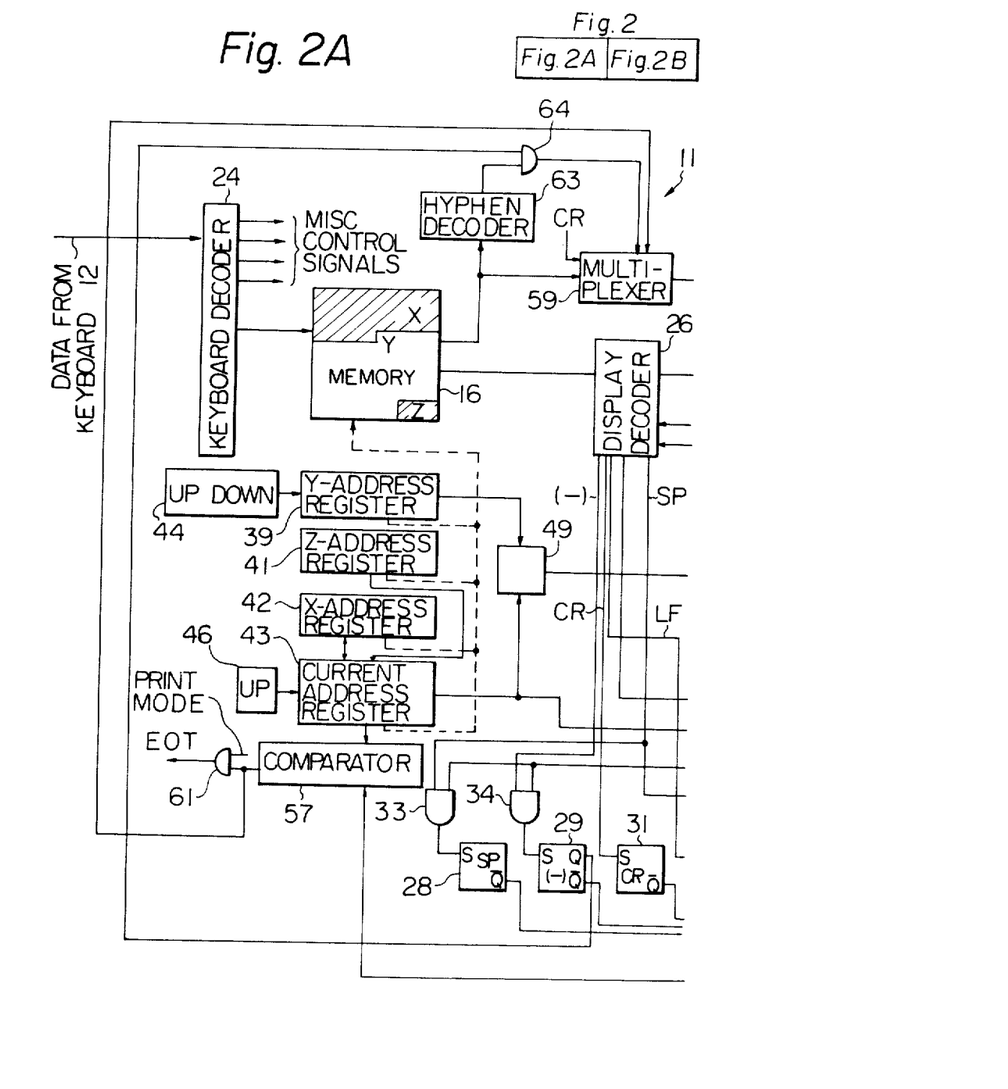
FIGS. 2A and 2B in combination constitute a detailed block diagram of the word processor.
Figure 2B:
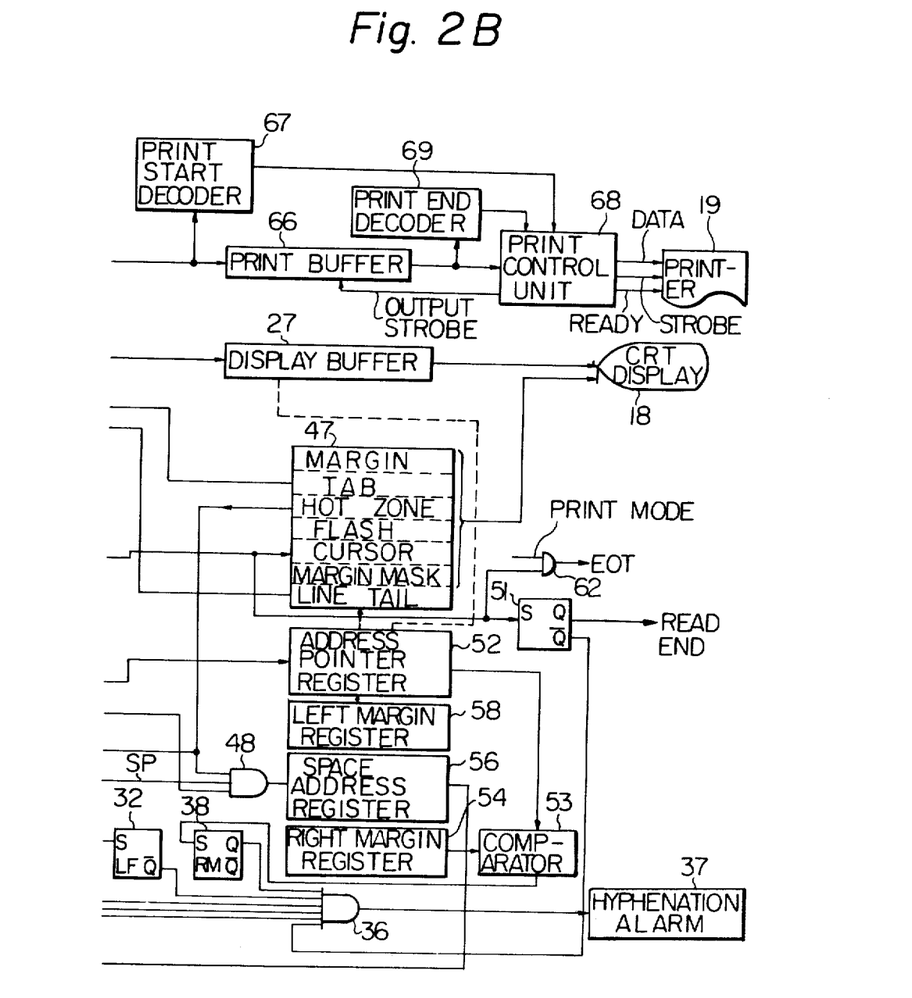

A detailed block diagram of the apparatus 11 is shown in FIG. 2. The data output from the keyboard 12 is fed to a keyboard decoder 24 which produces a number of control signal outputs for use by a general or overall control unit of the apparatus 11 which is not shown in detail. The keyboard decoder 24 also decodes the data signals and stores the same in the memory 16. The output of the memory 16 is applied to a display decoder 26 which separates the alphanumeric and symbol codes from the control codes and passes the data for display to a display buffer 27 in a manner which will be described hereinbelow. The data is passed from the display buffer 27 to the CRT display 18.

In response to space (SP), hyphen (-), carriage return (CR) or line feed (LF) codes the display decoder 26 feeds signals to set inputs of respective indicator flip-flops 28, 29, 31 and 32 respectively. The space and hyphen signals are passed through AND gate 33 and 34 respectively. The $\overline{Q}$ outputs of the flip-flops 28, 29, 31 and 32 are applied to inputs of an AND gate 36, the output of which is applied to a hyphenation alarm 37 such as a flashing light or buzzer. The Q output of a right margin indicator flip-flop 38 is also applied to an input of the AND gate 36.

A cursor or Y-address register 39, an end code or Z-address registre 41, a starting or X-address register 42 and a current address register 43 are connected to the memory 16. In addition, the registers 41 and 42 are connected to the register 43. An up-down drive unit 44 is connected to the register 39 and an up drive unit 46 is connected to the register 46.

The apparatus 11 further comprises a register unit 47 which contains seven registers, each having the same number of bits as one line of data in the display buffer 27. The register unit 47 is connected to the CRT display 18 to control the display of the marks mentioned hereinabove and to provide other functions. The seven registers are not individually designated by reference numerals but are clearly labeled.

The registers are used for margin, tabulation, hot zone, flash (character highlighting by flashing), cursor, margin mask and line tail respectively. Outputs of the tab and line tail registers are connected to the display decoder 26. An output of the hot zone register is connected to inputs of the AND gates 33 and 34 as well as to an input of an AND gate 48. The space code output of the display decoder 26 is connected to another input of the AND gate 48. The output of the register 43 is connected to another input of the AND gate 48 and also to an input of a comparator 49. The output of the register 39 is connected to another input of the comparator 49, the output of which is connected to the cursor register of the register unit 47. The output of the comparator 49 is also fed to the set input of a read end indicator flip-flop 51, the $\overline{Q}$ output of which is connected to yet another input of the AND gate 36.

Another output of the display decoder 26 is connected to a drive input of an address pointer register 52 which controls the position of the data on the display. The register 52 is connected to the register unit 47. The output of the address pointer register 52 is connected to an input of a comparator 53 which receives another input from a right margin register 54. The output of the comparator 53 is connected to the set input of the flip-flop 38.

The output of the AND gate 48 is connected to an input of a space address register 56, the output of which is connected to an input of a comparator 57. The output of the register 43 is connected to the other input of the comparator 57. The output of a left margin register 58 is connected to the address pointer register 52.

The output of the comparator 57 is connected to an input of a multiplexer 59, as is an output of the memory 16. Print mode inputs from the general control unit (not shown) are applied to inputs of AND gate 61 and 62 which each are capable of producing at their outputs an end of transfer signal EOT. Other inputs of the AND gates 61 and 62 are connected to outputs of the comparators 57 and 49 respectively.

The output of the memory 16 is also connected to a hyphen decoder 63, the output of which is applied to an input of an AND gate 64. The Q output of the flip-flop 29 is connected to another input of the AND gate 64. The output of the AND gate 64 is connected to another input of the multiplexer 59. An external carriage return (CR) code may also be applied to the multiplexer from the general control unit.

The output of the multiplexer 59 is applied to a print buffer 66 and a print start decoder 67. The output of the print buffer 66 is connected to an input of a print control unit 68 which feeds output storbe signals back to the print buffer 66. The output of the print buffer 66 is also fed to an input of a print end decoder 69, the output of which is connected to the print control unit 68. The output of the print start decoder 67 is also connected to the print control unit 68. The print control unit 68 feeds the data signals to the printer 19 together with strobe signals and is responsive to a ready signal from the printer 19. The output of the address pointer register 52 is applied to the display buffer 27 to select the address therein.

Figure 3:
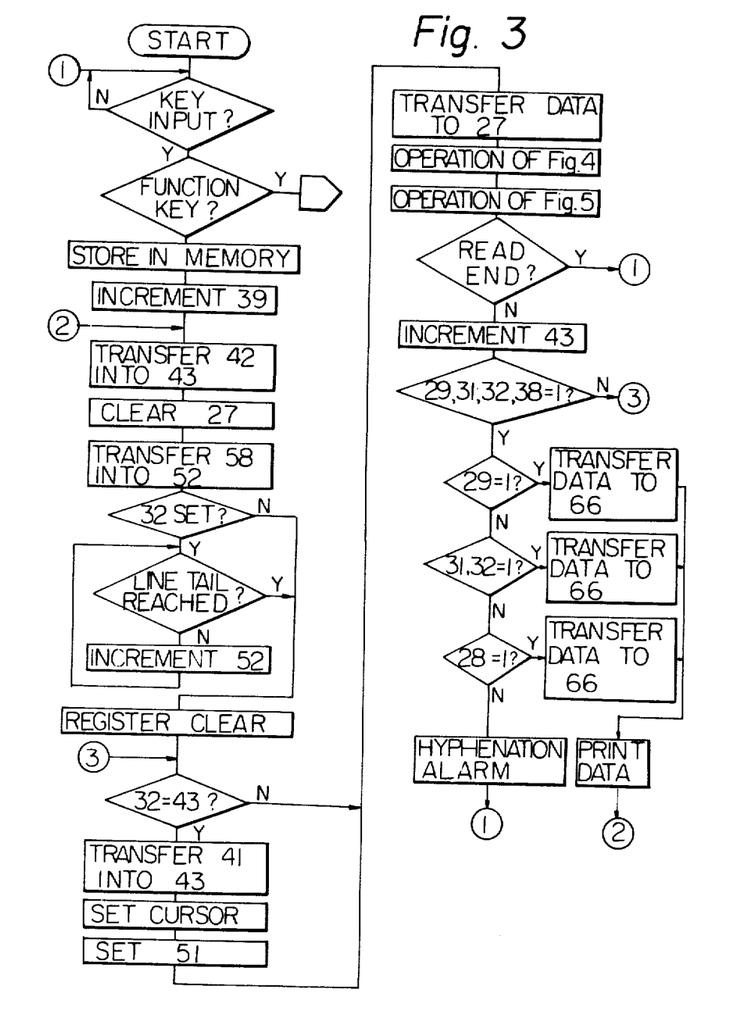
FIG. 3 is a flow chart of the operation of the word processor.
Figure 4:
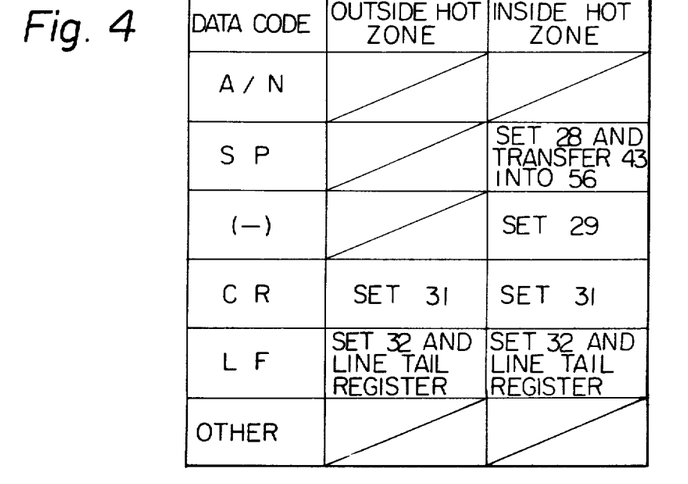
FIGS. 4 and 5 are tables illustrating the operation of the word processor.
Figure 5:
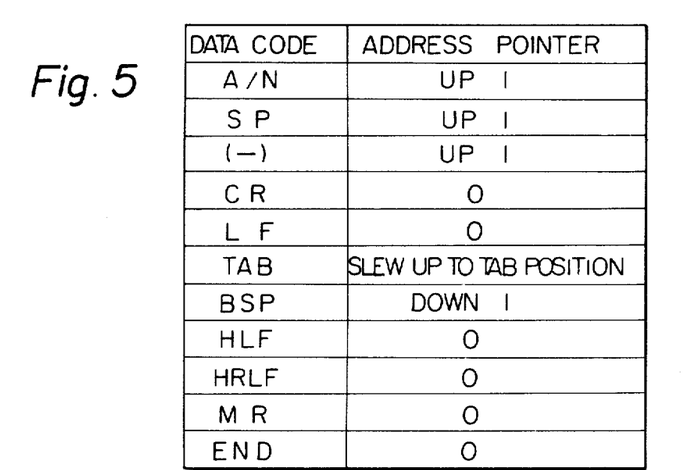

The operation of the apparatus 11 will now be described with reference being made to the drawing, particularly FIG. 2. A flowchart of the operation is presented in FIG. 3 and graphs illustrating various logical functions are presented in FIGS. 4 and 5.

Basic Data Entry and Display

The address specified in the X-address register 42, which is the starting address or the first available address in the memory 16, is fed into the current address register 43. The memory 16 typically has the capacity to store between several lines and one page of data. At the same time, the status of the line feed indicator flip-flop 32 is sensed. If the flip-flop 32 is logically low, the left margin address specified in the left margin address register 58 is fed into the address pointer register 52. This sets the first character or data space on the display unit 18 to the left margin. If the flip-flop 32 is logically high, indicating that the previous operation was a line feed operation, the contents of the line tail register of the register unit 47 are fed into the address pointer register 52 for increment. This sets the first data space on the display unit 18 to the data space at which the cursor was positioned at the time the line feed operation was effected.

After positioning of the first data space on the display unit 18 is completed, the indicator flip-flops 28, 29, 31, 32, 38 and 51 as well as the flash, cursor, margin mask and line tail registers of the register unit 47 are reset or closed. This latter operation will be referred hereinbelow as "register clear", and will not be described in detail repetitiously.

When the operator of the apparatus 11 depresses a key on the keyboard 12, a data code indicating the desired alphanumeric character, symbol, or control function is entered into the memory 16 and the drive unit 44 increments the Y-address register 39. It will be understood that the Y-address register 39 can also be decremented by the unit 44 for editing or composing. The display buffer 27 is cleared prior to entry of the new data. The X address is set into the current address register 43 from the register 42 and the data in the X address is transferred to the display buffer 27. Thereafter, the unit 46 increments the current address register 43 to read data from successively higher data positions in the memory 16 in synchronism with incrementation of the address pointer register 52 to enable successively higher data positions in the display buffer 27. In this manner, the data in the memory 16 between the X and Y positions is tranferred into the display buffer 27 and displayed on the display unit 18.

The transfer of data is terminated when the comparator 49 detects coincidence between the contents of the registers 39 and 43. The comparator 49 produces a logically high output which is fed to the cursor register of the register unit 47 to position the cursor at the position corresponding to the Y or current address in the memory 16. As long as alphanumeric data or symbols are input into the memory 16 and the right margin is not reached, the input operation described hereinabove is continued. After transfer to the display buffer 27 is completed, the data in the display buffer is continuously displayed on the display unit 18.

The output of the comparator 49 is also applied to the set input of the read end flip-flop 51 and sets the same. The Q output of the flip-flop 51 constitutes a read end signal which indicates that the reading of data from the memory 16 into the display buffer 27 is completed. In response to the read end signal the contents of the Z address register are fed into the current address register 43. An end code is stored at the Z address in the memory 16, and is decoded by the display decoder 26. In response, the transfer operation is terminated and the register clear operation is effected. For entry of subsequent alphanumeric data and symbols, the display decoder 26 increments the Y-address register 39 by means of the drive unit 44 and also the address pointer register 52 in response to decoding of an alphanumeric or symbol code.

Hyphenation Alarm at Right Margin

After a character or symbol is input and displayed at the position next to the right margin, the address pointer register 52 is incremented to the right margin position and the comparator 53 senses coincidence between the contents of the registers 52 and 54. As the flip-flop 51 was reset during this operation, the high $\overline{Q}$ output thereof enables the AND gate 36. It will be assumed that the flip-flops 28, 29, 31 and 32 are reset and the high $\overline{Q}$ outputs thereof also enable the AND gate 36. The high output of the comparator 53 sets the flip-flop 38 and the high Q output thereof is applied to the AND gate 36 so that the AND gate 36 produces a high output which is fed to the hyphenation alarm 37.

The hyphenation alarm 37 may be a flashing light, buzzer or the like and is energized to warn the operator that the right margin has been reached. The apparatus 11 is placed on standby awaiting action by the operator, which may be to press the carriage return key or edit the data. In the latter case, editing is necessary if the right margin was reached in the middle of a word. After the action is taken, the operator may press the hyphen key which will cause the printer 19 to print the line of data.

Carriage Return Operation

Depression of the carriage return key on the keyboard 12 will cause the line of data stored in the display buffer 27 to be printed in the following manner. The carriage return code is decoded by the display decoder 26 which sets the flip-flop 31. The low $\overline{Q}$ output of the flip-flop 31 is applied to the AND gate 36 to inhibit the hyphenation alarm 37. The general control unit detects the high Q output of the flip-flop 31 to initiate the printing operation.

The X address is transferred into the current address register 43 from the register 42 and the register 43 is incremented by the unit 46 to successively read the locations in the memory 16 from X to Y and transfer the data contained therein to the print buffer 66 through the multiplexer 59. In synchronism, input strobe signals are applied to the print buffer 66 to sequentially enable the data locations therein. The print mode signal is applied to the AND gate 62 to enable the same. The AND gate 62 produces the end of transfer signal EOT when the Y address is reached and the comparator 49 produces a high output. The EOT signal causes the display buffer 27 to be cleared in preparation for display of the next line of data and the contents of the current address register 43 to be transferred into the X-address register 42 to set the new X address equal to the old Y address.

Simultaneously the print start decoder 67 decodes the data and produces a print start signal in response to the carriage return code CR. This indicates that the entire line of data has been stored in the print buffer 66. The print control unit 68, in response to the print start signal, feeds output strobes to the print buffer 66 causing the data to be transferred from the print buffer 66 to the print control unit 68. The print control unit 68 receives a ready signal from the printer 19 when the printer 19 is free for operation. The print control unit 68 feeds the data and print strobes to the printer 19 causing the printer 19 to print the line of data stored in the print buffer 66. It will be noted that during this time the keyboard 12 and display unit 18 are free to input the next line of data.

The print end decoder 69 searches the data for the CR code and feeds a print end signal to the print control unit 68 in response thereto. The print end signal causes the printer 19 to terminate printing and return to standby in preparation for printing the next line. The printer 19 feeds the print ready signal to the print control unit 68 upon entering the standby condition. Also in response to the print end signal the print buffer 66 is cleared in preparation for the next line printing operation. The printer 19 effects a carriage return operation after printing the line of data.

Line Feed Operation

The line feed operation is similar to the carriage return operation except as will be described below. The print start and end decoders 67 and 69 respectively are responsive to the line feed code LF in the same manner as to the carriage return code CR.

The display decoder 26, in response to the LF code, sets the flip-flop 32. Although the Y-address register 39 is incremented, the address pointer register 52 is not incremented. The contents of the address pointer register 52 are fed into the line tail register of the register unit 47. The printing operation is then carried out in the same manner as in the carriage return operation.

As described in the basic data entry and display section hereinabove, for displaying the next line of data the status of the flip-flop 32 is read and the contents of the line tail register of the register unit 47 are fed into the address pointer register 52 rather than the left margin address so that the next line of display starts at the data position at which the line feed operation was initiated.

Hyphen in Hot Zone

A high signal is applied from the hot zone register of the register unit 47 to the AND gate 34 when the address in the address pointer register 52 is in the hot zone. This enables the AND gate 34. When a hyphen code is decoded by the display decoder 26, the flip-flop 29 is set and the high Q output thereof is applied to the AND gate 64. The printing operation is then initiated in the same manner as described above.

In response to the hyphen code transferred from the memory 16 to the multiplexer 59, the hyphen decoder 63 produces a signal which is gated through the AND gate 64 to the multiplexer 59. In response to this signal, the multiplexer 59 adds a CR code to the data following the hyphen code. This CR code is decode by the decoders 67 and 69 to begin and end the printing operation respectively.

It will be noted that the printing operation in response to depression of the hyphen key on the keyboard 12 occurs only when the hyphen is in the hot zone. The length of the hot zone is selected so that if a hyphen is detected therein it is statistically unlikely that enough space remains for another word in the line.

Space Code in Hot Zone

When a space code is detected in the hot zone and the right margin has been reached it is statistically likely that the operator has attempted to input too much data in the line. In this case, the printing operation is automatically effected and the display of the next line is initiated at the data address in the memory following the space. Thus, the excessive data is displayed at the beginning of the next line.

In response to a space in the hot zone, the flip-flop 28 is set. The AND gate 48 is enabled by the hot zone register of the register unit 47 and also by the display decoder 26 in response to the space code. This allows the contents of the current address register 43, which correspond to the address of the space in the hot zone, to be stored in the space address register 56. If another space code is detected after the first space code, the address of the new space code will be stored in the space address register 56. In this manner, the address of the space nearest the right margin is stored in the space address register 56.

When the right margin is reached the flip-flop 38 is set by the comparator 53. The hyphenation alarm 37 is inhibited by the low $\bar{Q}$ output of the flip-flop 28 applied to the AND gate 36.

The general control unit, in response to setting of both flip-flops 28 and 38, applies the print mode signal to the AND gate 61 and initiates the printing operation. When the address in the current address register 43 equals the address in the space register 56 corresponding to the address of the space nearest the right margin in the hot zone, the comparator 57 produces a high output which is gated through the AND gate 61 as the EOT signal. The EOT signal is also applied to the multiplexer 59 causing the same to add a CR code to the data after the space code. The register 43 is incremented and the contents thereof transferred to the X-address register 42. Thus, the next line of display will begin at the data position following the space.

Figure 6:
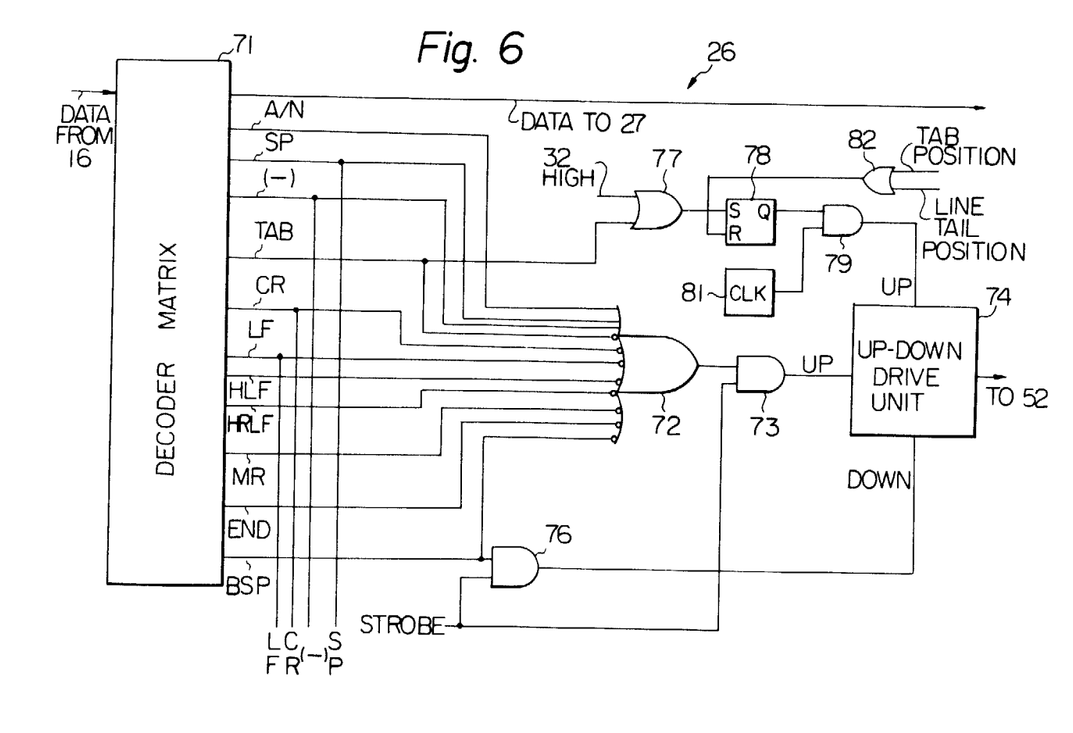
FIG. 6 is a schematic diagram of part of the word processor.

FIG. 6 shows an exemplary embodiment of the display decoder 26 as comprising a decoder matrix 71. The alphanumeric (A/N) data, space (SP) and hyphen (-) code outputs of the matrix 71 are applied to non-inverting inputs of an OR gate 72. TAB, CR, LF, half line feed (HLF), half reverse line feed (HRLF), margin release (MR), END and backspace (BSP) code outputs are applied to inverting inputs of the OR gate 72 respectively. The output of the OR gate 72 is applied to an AND gate 73 which receives strobe signals at another input thereof. The output of the AND gate 73 is applied to an UP drive input of an up-down drive unit 74.

The BSP code output of the matrix 71 and the strobe signals are applied to inputs of an AND gate 76, the output of which is applied to a DOWN drive input of the unit 74.

The TAB code output of the matrix 71 and the Q output of the line feed indicator flip-flop 32 are applied to inputs of an OR gate 77, the output of which is applied to a set input of a flip-flop 78. The Q output of the flip-flop 78 and the output of a clock pulse generator 81 are applied to inputs of an AND gate 79, the output of which is applied to another up drive input of the unit 74. Outputs of the tab and line tail registers of the register unit 47 are applied to inputs of an OR gate 82, the output of which is applied to the reset input of the flip-flop 78. The inputs to the OR gate 82 indicate that the tabulation or line tail position respectively has been reached.

In operation, each time a data code is entered from the keyboard 12 a strobe signal is fed to the AND gates 73 and 76. When the code is A/N, SP or -, a signal is gated from the matrix 71 through the OR gate 72 to the AND gate 73 in synchronism with the strobe signal. Thus, the AND gate 73 produces a signal which is applied to the unit 74 causing the same to feed a signal to the address pointer register 52 which causes the register 52 to increment. All other codes inhibit the AND gate 73. The BSP code is applied to the AND gate 76 which produces a high output in response to a backspace code. This is applied to the unit 74 which feeds a signal to the register 52 causing the same to decrement.

The unit 74 is also used to slew the address pointer register 52 for tabulation and line feed operations. The flip-flop 78 is set in response to either a TAB code from the matrix 71 or a high Q signal from the flip-flop 32. The resulting high Q output of the flip-flop 78 enables the AND gate 79 so that clock pulses from the generator 81 are applied to the unit 74. The unit 74 causes the register 52 to increment in response to each clock pulse. The flip-flop 78 is reset thereby inhibiting the AND gate 79 when either the tabulation point or the line tail is reached depending on whether the operation is tabulation or line feed. The CR, LF, SP, - and A/N operations are summarized in FIG. 4 and the operation of the display decoder 26 is summarized in FIG. 5.

As mentioned hereinabove, it is desirable to display control codes in addition to character and symbol codes and further to maintain the display positions identical to the printing positions. Whereas prior art apparatus display control codes mixed with the character codes, the control codes displace the character codes rightwardly so that the position of a particular character on the display is rightward of the same character as printed.

Figure 8:
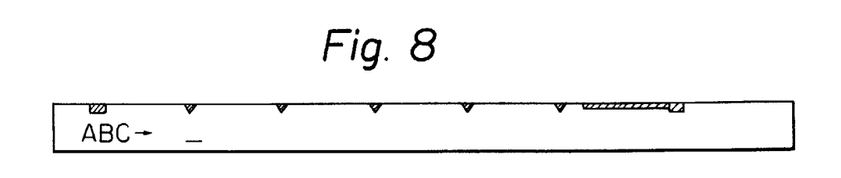

FIG. 8 shows an example of such a display. In this case, the characters A, B and C are input and the tab key depressed. The cursor is moved to the first tabulation point and a rightwardly pointing arrow, indicating tabulation, is displayed in the space next to the character C.

Figure 9:
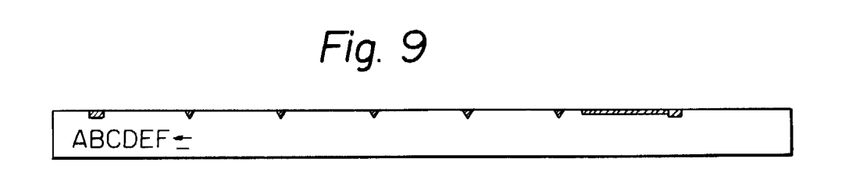

FIG. 9 illustrates a case in which the characters A through F are input and the carriage return key is depressed. This initiates the printing operation. The cursor is not moved rightwardly as described above but a leftwardly pointing arrow indicating carriage return is displayed in the space next to the character F above the cursor before the display is cleared.

Figure 10:
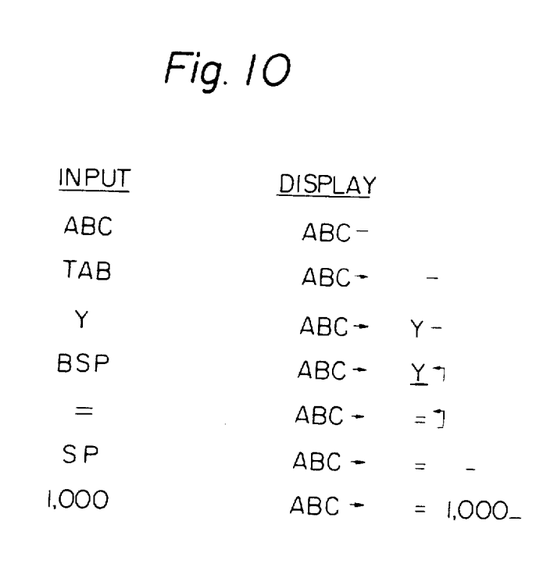
FIG. 10 is a graphic representation of a display function of the word processor.

FIG. 10 shows the operation of the apparatus 11 in displaying (ABC ¥ 1,000). The Japanese Yen sign (¥) is made by typing an equal sign (=) over the capital letter (Y). The operations of typing ABC followed by tabulation correspond to FIG. 8. Subsequently, the letter Y is input followed by a backspace (BSP). The cursor is moved back under the letter Y and a backspace mark (↹) is displayed to the right of the letter Y. Next, an equal sign (=) is input to complete the symbol ¥. However, only the last entered data in the position of the letter Y, in this case the symbol =, is displayed. The cursor is moved rightwardly by one data space. As illustrated, a space (SP) code is then entered which moves the cursor rightwardly by one more position. Finally, 1,000 is entered. The final display is ABC=1,000 although the printed output will be ABC ¥ 1,000.

It will be seen that although it is possible to display only one character or symbol at a particular data position on the display, the positions of all data on the display correspond to the positions as printed. For each data position, where a typeover is accomplished to produce a composite symbol, the last entered data will be displayed. This makes it much easier to accurately compose the data on the display.

In summary, it will be seen that the present invention provides a word processor which operates at substantially improved speed and efficiency compared to the prior art. In addition, the data positions on the display correspond to data positions as printed, even if composite characters are produced by typeover operations. Various modifications will become possible for those skilled in the art after receiving the teachings of the present disclosure without departing from the scope thereof.

What is claimed is:

1. A word processor comprising:
   an input keyboard;
   a memory for storing word data input from the keyboard;
   a display unit for displaying one line of data from the memory;
   a printer for printing the line of data;
   a display buffer for storing the line of data for display by the display unit;
   a print buffer for storing the line of data for printing by the printer; and
   control means for decoding data transmitted from the memory to the display buffer and causing the line of data to be transmitted from the memory to the print buffer for printing in response to a predetermined data code;
   the memory being constructed to store a subsequent line of data, the display buffer being constructed to store the subsequent line of data and the display unit being constructed to display the subsequent line of data while the printer is printing the line of data stored in the print buffer.

2. A word processor as in claim 1, in which the predetermined data code comprises at least one of a carriage return code and a line feed code.

3. A word processor as in claim 1, further comprising register means for defining a hot zone at a right end of the line of data which is stored in the display buffer, the predetermined data code comprising at least one of a space code in the hot zone and a hyphen code in the hot zone.

4. A word processor as in claim 1, in which the control means comprises a current address register for storing a current address in the memory, a starting address register for storing a starting address of the line of data in the memory, cursor address register for storing a cursor address of the line of data in the memory, comparator means for sensing coincidence between contents of the current address register and the cursor address register and incrementation means for incrementing the current address register, the control means further comprising means to transfer data from the memory to the display buffer and print buffer by setting contents of the starting address register into the current address register, incrementing the current address register while transferring data and terminating transfer of data when the contents of the current address register and cursor address register coincide.

5. A word processor as in claim 1, in which the control means further comprises register means for storing mark data produced by decoding the data, the display unit being constructed to display marks corresponding to the mark data in the register means adjacent to the line of data.

6. A word processor as in claim 5, in which the marks comprise at least one of a left margin mark, a right margin mark, a cursor mark, a tab mark and a hot zone mark.

7. A word processor as in claim 1, in which the control means further comprises an address pointer register for storing a current address in the display buffer, a left margin address register for storing a left margin address in the display buffer and a line tail address register for storing a line tail address in the display buffer corresponding to a current address at which a previous line feed operation was effected, the control means further comprising means for selectively setting contents of the left margin address register and the line tail address register into the address pointer register prior to transfer of data from the memory into the display buffer.

8. A word processor as in claim 3, in which the predetermined data code further comprises a space code in the hot zone, the control means further comprising means for controlling the display unit to display a subsequent line of data starting at a data position following the space in the hot zone.

9. A word processor as in claim 1, in which the control means comprises means for detecting when a right margin position is reached and producing a hyphenation alarm in response thereto.

10. A word processor as in claim 1, in which the control means comprises decoder means for decoding the data and a status indicator means which is set in response to the predetermined data code.

11. A word processor as in claim 1, in which the memory unit is constructed to store a subsequent line of data, the display buffer being constructed to store the subsequent line of data and the display unit being constructed to display the subsequent line of data while the printer is printing the line of data stored in the print buffer.

12. A word processor as in claim 1, in which the display unit is constructed to display control codes including a backspace code.

13. A word processor comprising:

an input keyboard;

a memory for storing word data input from the keyboard;

a display unit for displaying one line of data from the memory;

a printer for printing the line of data;

a display buffer for storing the line of data for display by the display unit;

a print buffer for storing the line of data for printing by the printer; and control means for decoding data transmitted from the memory to the display buffer and causing the line of data to be transmitted from the memory to the print buffer for printing in response to a predetermined data code;

the control means comprising a current address register for storing a current address in the memory, a starting address register for storing a starting address of the line of data in the memory, cursor address register for storing a cursor address of the line of data in the memory, comparator means for sensing coincidence between contents of the current address register and the cursor address register and incrementation means for incrementing the current address register, the control means further comprising means to transfer data from the memory to the display buffer and print buffer by setting contents of the starting address register into the current address register, incrementing the current address register while transferring data and terminating transfer of data when the contents of the current address register and cursor address register coincide.

14. A word processor comprising:

an input keyboard;

a memory for storing word data input from the keyboard;

a display unit for displaying one line of data from the memory;

a printer for printing the line of data;

a display buffer for storing the line of data for display by the display unit;

a print buffer for storing the line of data for printing by the printer; and control means for decoding data transmitted from the memory to the display buffer and causing the line of data to be transmitted from the memory to the print buffer for printing in response to a predetermined data code;

the control means further comprising an address pointer register for storing a current address in the display buffer, a left margin address register for storing a left margin address in the display buffer and a line tail address register for storing a line tail address in the display buffer corresponding to a current address at which a previous line feed operation was effected, the control means further comprising means for selectively setting contents of the left margin address register and the line tail address register into the address pointer register prior to transfer of data from the memory into the display buffer.

15. A word processor comprising:

an input keyboard;

a memory for storing word data input from the keyboard;

a display unit for displaying one line of data from the memory;

a printer for printing the line of data;

a display buffer for storing the line of data for display by the display unit;

a print buffer for storing the line of data for printing by the printer; and control means for decoding data transmitted from the memory to the display buffer and causing the line of data to be transmitted from the memory to the print buffer for printing in response to a predetermined data code;

the display unit being constructed to display control codes including a backspace code.

* * * * *